Feb. 7, 1928.  
D. L. STOKES  
1,658,747  
PORTABLE PULLING MACHINE  
Filed June 23, 1921  
2 Sheets-Sheet 1

Inventor:  
Davis L. Stokes  
By Julian C. Dowell  
His Attorney.

Feb. 7, 1928.

D. L. STOKES 1,658,747

PORTABLE PULLING MACHINE

Filed June 23, 1921    2 Sheets-Sheet 2

Inventor:
Davis L. Stokes
By Julian C. Dowell
His Attorney.

Patented Feb. 7, 1928.

1,658,747

UNITED STATES PATENT OFFICE.

DAVIS L. STOKES, OF JEFFERSONVILLE, GEORGIA.

PORTABLE PULLING MACHINE.

Application filed June 23, 1921. Serial No. 479,713.

This invention relates to machines used for pulling and hoisting movable objects, and more particularly to a combined pulling and lifting machine, and the objects are to provide a portable pulling machine especially designed and adapted for use in drawing automobiles, trucks or other vehicles out of a mud hole or when stuck in a muddy road, or for righting or restoring an overturned car to normal position, and for lifting automobile bodies from the chassis and also for stretching and tightening wire fences, and for various other purposes for which a portable device of this character may be used; the machine frame being supported on rolling devices to adapted the machine to be easily moved from place to place, and said devices being adapted to be raised and secured in fixed positions above the bottom of the frame to economize space in packing for transportation and to adapt the frame to rest upon the ground when the machine is being used; the machine being also provided with a lifting jack for raising an automobile or truck when out on the road or in a garage, for the purpose of removing a tire, and to remove the stakes driven into the ground for securing thereto one end of the cable, at the end of the pulling operation, the jack-rack and operating lever being removable when not in use for packing and economizing space in transporting the machine from place to place or carrying it about for use when needed out on the road.

The invention will first be hereinafter more particularly described, with reference to the accompanying drawings, which are to be taken as a part of this specification, and then pointed out in the claims at the end of the description.

In said drawings,

Fig. 3 is a fragmentary detail view of one of the front supporting wheels, illustrating the mode of attachment to the supporting frame;

Fig. 4 is a similar view of the rear supporting wheel;

Fig. 5 is a detail view of the jack-rack detached.

Figure 1:
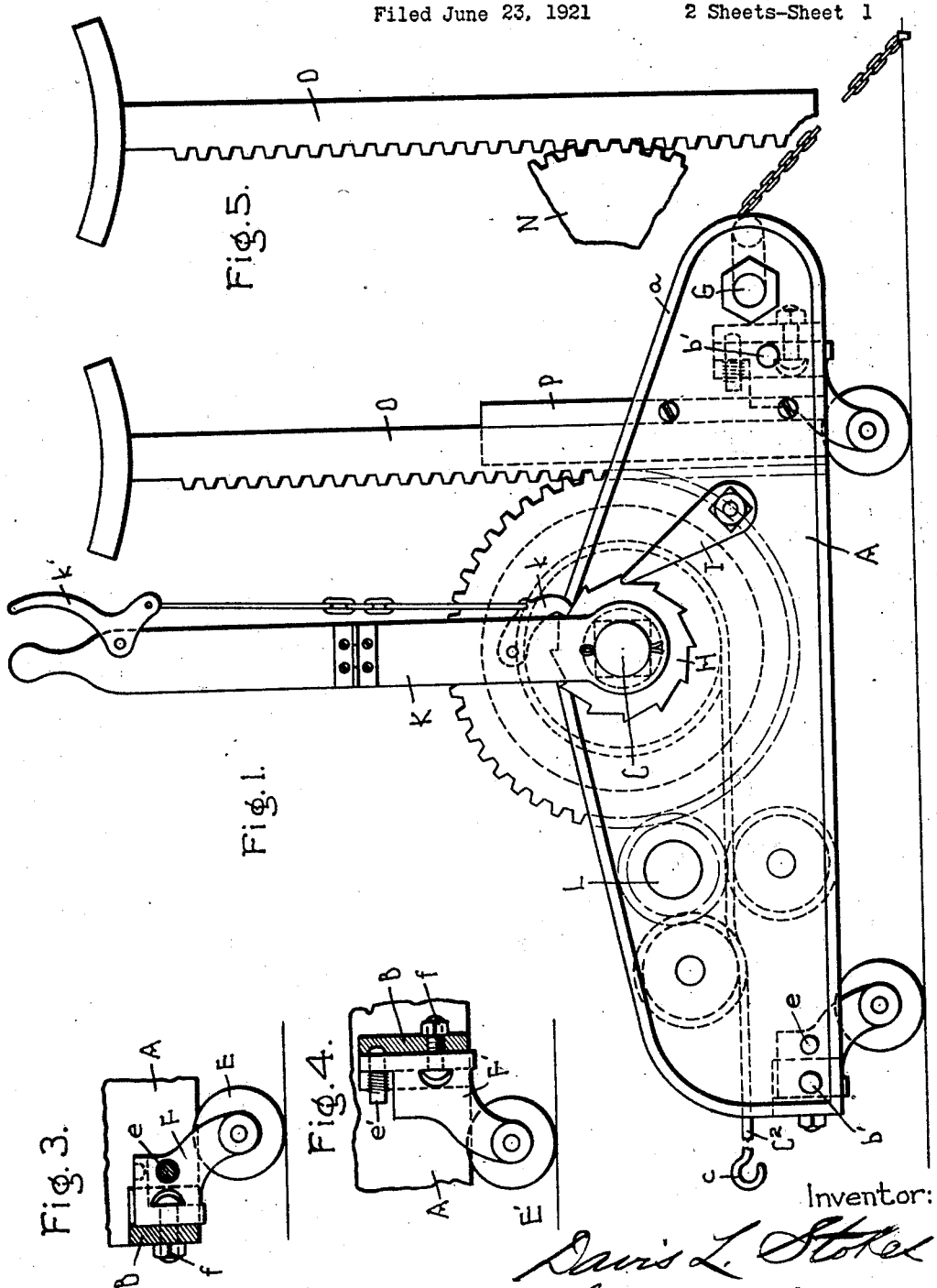
Fig. 1 represents a side elevation of a portable pulling and hoisting machine embodying my invention.
Figure 2:
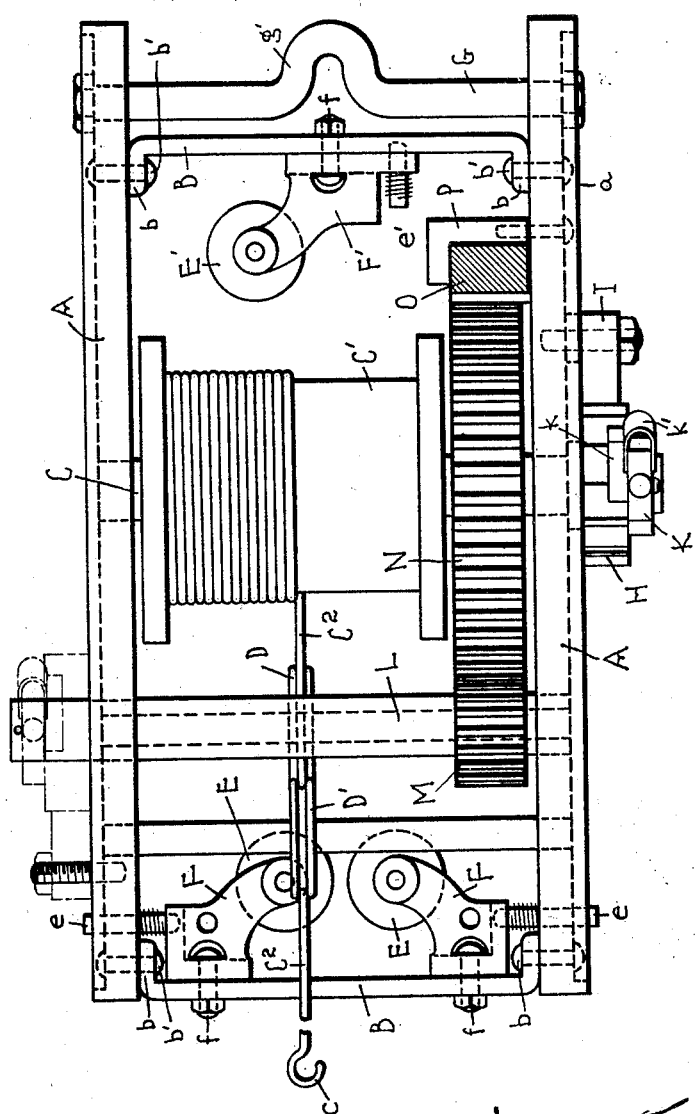
Fig. 2 is a plan view of the same.

Referring to said drawings, in which the same reference characters are used to denote corresponding parts in different views, the supporting frame may be of the form shown or any suitable construction, but I preferably use a steel frame composed of side plates A and transverse connecting bars B; said plates being of the form shown, and each having an outwardly turned marginal flange $a$, which extends entirely around the edge of the plate. These plates are connected and firmly secured together by the cross-bars B having apertured end flanges $b$ to receive fastening bolts $b^1$ inserted through holes in the side plates registering with said apertures. C denotes a shaft carrying a drum $C^1$ on which is wound a cable $C^2$, the free end of which may be provided with a hook $c$ for attachment to the object to be moved. The cable $C^2$ passes from the drum over a guide pulley-wheel D and under a similar pulley-wheel $D^1$ each loosely fitted on a transverse shaft or rod having its ends secured to the side bars of the supporting frame so that as the cable is wound upon the drum said pulley-wheels may move sidewise along said shafts, thus guiding and holding the cable in proper position as it is wound upon the drum. The frame bar B at the front of the machine has pivotally secured thereto, near each end, a roller or caster wheel E, which is journaled in a depending arm of a bracket F pivoted to the frame bar B. The rear frame bar B has pivoted thereto intermediate its ends a bracket $F^1$ also having a depending arm in which is journaled a roller $E^1$. The brackets F and $F^1$ are secured to the frame bars B by pivot bolts $f$ so that when not in use the rollers E and $E^1$ may be raised, by turning the brackets F and $F^1$ on their pivots, and held in a horizontal position, as shown in Fig. 2 of the drawings. To this end each of the roller-carrying brackets is formed or provided with a three-sided head portion in which holes are formed to receive fastening bolts. Two of said holes, in the normal position of the rollers, extend horizontally, at right angles to each other, while the third hole extends at right angles to the other two holes. The third hole in the two foremost brackets is adapted to receive a spring-actuated pin $e$, which is slidably secured in a hole through one of the side plates A of the supporting frame, so that when the brackets F are turned to a horizontal position said pins will enter said third holes and hold the bracket arms and rollers thereon in a horizontal position. If desired, the spring actuated pins may be carried by the adjustable brackets, so as to adapt one end of the pin to enter a hole or socket in the frame bar to which the bracket is secured, and thus hold the bracket and roller carried thereby in a horizontal position. This construction is shown in connection with the rear roller, Fig. 2, in which the spring-pressed pin $e^1$ passes through a hole in the bracket and enters a socket or hole in the frame bar B. At the rear end of the supporting frame I provide what I term an anchor hook for attaching thereto one end of a chain or rope the other end of which may be secured to a stake driven in the ground or to a tree or post or other fixed object for holding the machine stationary when the drum is operated for pulling or hoisting purposes. Said anchor hook consists of a crooked cross-bar G, the reduced ends of which protrude through holes in the side plates of the supporting frame and have nuts $g$ screwed thereon for securing it to said frame, said cross-bar being bent as at $g^1$ to form what I term the anchor hook, said bar also serving as a means for strengthening the supporting frame and clamping the side bars thereof firmly against the rear transverse frame bar.

The drum shaft C has preferably reduced end portions fitted in holes or bearings provided therefor in the side plates of the supporting frame. At one end said shaft C projects beyond the side plate and has formed thereon beside the adjacent side plate a square or polygonal portion to receive a ratchet wheel H having a central opening of square or polygonal form for engagement with the square or polygonal end portion of the drum shaft, so that the drum shaft and ratchet wheel are caused to rotate together. A gravity actuated or spring-pressed pawl or dog I, pivoted on the supporting frame and engaging the teeth of the ratchet, prevents movement thereof and of the drum in a backward direction. The extreme outer end of the drum shaft is round or shaped to receive a round or correspondingly shaped opening in one end of a lever K, which has a pawl $k$ pivoted thereto and provided with a tooth adapted to engage the teeth of the ratchet wheel H and rotate the latter when the free arm of the lever is moved in a forward direction, said pawl $k$ being either gravity-actuated or spring-pressed, and operated by chain and link connection with a thumb lever $k^1$ pivoted on the free end of the lever K, for raising the pawl out of engagement with the ratchet wheel; the pawl being adapted to slide over the teeth of the ratchet when the lever is thrown back, and the drum held stationary by the dog I. The lever K is detachable and constructed in sections hinged together so that when detached it may be folded to take up less room when the machine is being transported from place to place and other parts arranged in compact form.

As thus constructed, the machine is operable, by means of the operating lever K and associated parts, for either pulling an automobile or other vehicle out of the mud or for stretching a fence wire, or hoisting objects, but preferably I provide means whereby greater force may be exerted by the actuating lever, and to this end there is journaled in the side plates of the supporting frame, parallel with the drum shaft, a counter-shaft L, which carries a pinion M in mesh with a gear wheel N on the drum shaft; one end of said counter-shaft projecting beyond the side bar of the supporting frame at the side of the machine opposite the projecting end of the drum shaft, and having its projecting end formed with a square or polygonal portion and a rounded or equivalent end portion the same as the projecting end of the drum shaft, for the application thereto of the operating lever and ratchet wheel, in the manner indicated in dotted lines in Fig. 2 of the drawings; the lever and ratchet wheel being removed from the drum shaft and secured on the end of the counter-shaft, and the dog I secured to the opposite frame bar in position to engage the ratchet wheel on the other side of the supporting frame. By shifting the lever and ratchet wheel and pawl from the drum shaft to the counter shaft a compound movement is provided whereby the drum may be rotated with less speed and increased power.

Connected with the pulling mechanism adjacent the gear wheel N on the drum shaft and in mesh therewith is a jack-rack O, which is slidable vertically in a guide bar P attached to the supporting frame so that when not needed the rack-bar may be removed and carried horizontally on the supporting frame and may be easily restored to operative position when desired for use in raising an object, for example, an automobile axle, for the purpose of putting on a tire, or to pull up a stake used to anchor the machine when used to pull a vehicle out of the mud or the like.

The invention is specially designed and adapted to serve as a necessary part of an automobile equipment in traveling, being adapted to occupy very little space, as it may not measure more than twelve inches in length and eight inches in width and height, but it is also a very useful adjunct for many other purposes than lifting or drawing another vehicle, or other movable object; and the parts are so constructed and arranged that the operating lever may be removed and folded and the jack-rack also removed and placed horizontally on the machine frame and the supporting wheels raised to a horizontal position, in the plane of the side bars of the frame, so that the entire machine, while very powerful for pulling and lifting, may be knocked down and carried in a box twelve inches square, or it may be carried with other tools in a convenient receptacle therefor on an automobile ready for use when needed.

It will be understood of course that various changes may be made in the details and arrangement of parts, without departing from the spirit and scope of my invention, and I do not desire to be limited in the appended claims to the specific construction and arrangement illustrated and described.

Having thus described my invention, what I claim as new and desire to secure by Letters Patent of the United States is:—

1. A pulling machine comprising a supporting frame mounted on rollers, a drum shaft journaled in said frame having a gear wheel thereon, a ratchet wheel fixed on said shaft, an operating lever mounted loosely on said shaft and carrying a pawl adapted to engage said ratchet wheel and rotate said shaft when said lever is moved in one direction only, a dog pivoted on said frame in engagement with the teeth of said ratchet wheel to prevent rotation thereof in a backward direction, a cable adapted for connection with an object to be moved and to be wound upon said drum by said operating lever, and means for anchoring or holding said machine stationary during the pulling operation, together with a counter-shaft carrying a pinion in mesh with the gear wheel on said drum shaft; said lever and ratchet wheel being adapted to be removed from said drum shaft and secured on said counter-shaft for operating said drum shaft with increased power.

2. A pulling machine comprising a supporting frame mounted on wheels, a shaft journaled in said frame carrying a ratchet wheel and a drum having a cable wound thereon and adapted for connection with an object to be moved, a gear wheel fixed on said shaft, a counter-shaft journaled in said frame and carrying a pinion in mesh with said gear wheel, an operating lever removably and loosely mounted on said shaft and carrying a pawl engaging said ratchet wheel, a dog pivoted on said frame in engagement with the teeth of said ratchet wheel to prevent rotation thereof in a backward direction, said lever and ratchet wheel being removable and adapted to be secured on the end of said counter-shaft at the side of the machine opposite the end of the drum shaft on which the lever and ratchet are normally secured.

3. A combined pulling and lifting machine comprising a supporting frame having a drum revolubly mounted thereon, said drum being fixed on a shaft carrying a gear-wheel and said frame having a vertical guideway thereon facing the toothed periphery of said gear-wheel, a cable adapted to be wound upon said drum for connection with an object to be moved, a lever and ratchet wheel mounted on the shaft for rotating said drum, a vertically movable rack-bar supported in said guideway with its teeth in mesh with said gear-wheel, and means for holding said frame stationary during the pulling operation of the machine; said rack-bar being adapted to be removed when the machine is used for pulling; a counter-shaft carrying a pinion in mesh with the gear-wheel on said drum-carrying shaft; said lever and ratchet-wheel being adapted to be removed from said shaft and secured to said counter-shaft for operating said drum-carrying shaft with increased power.

In testimony whereof I affix my signature.

DAVIS L. STOKES.